Sept. 22, 1953
C. J. THATCHER
2,653,012
METHOD AND SYSTEM FOR AIR CONDITIONING
Filed Aug. 12, 1948
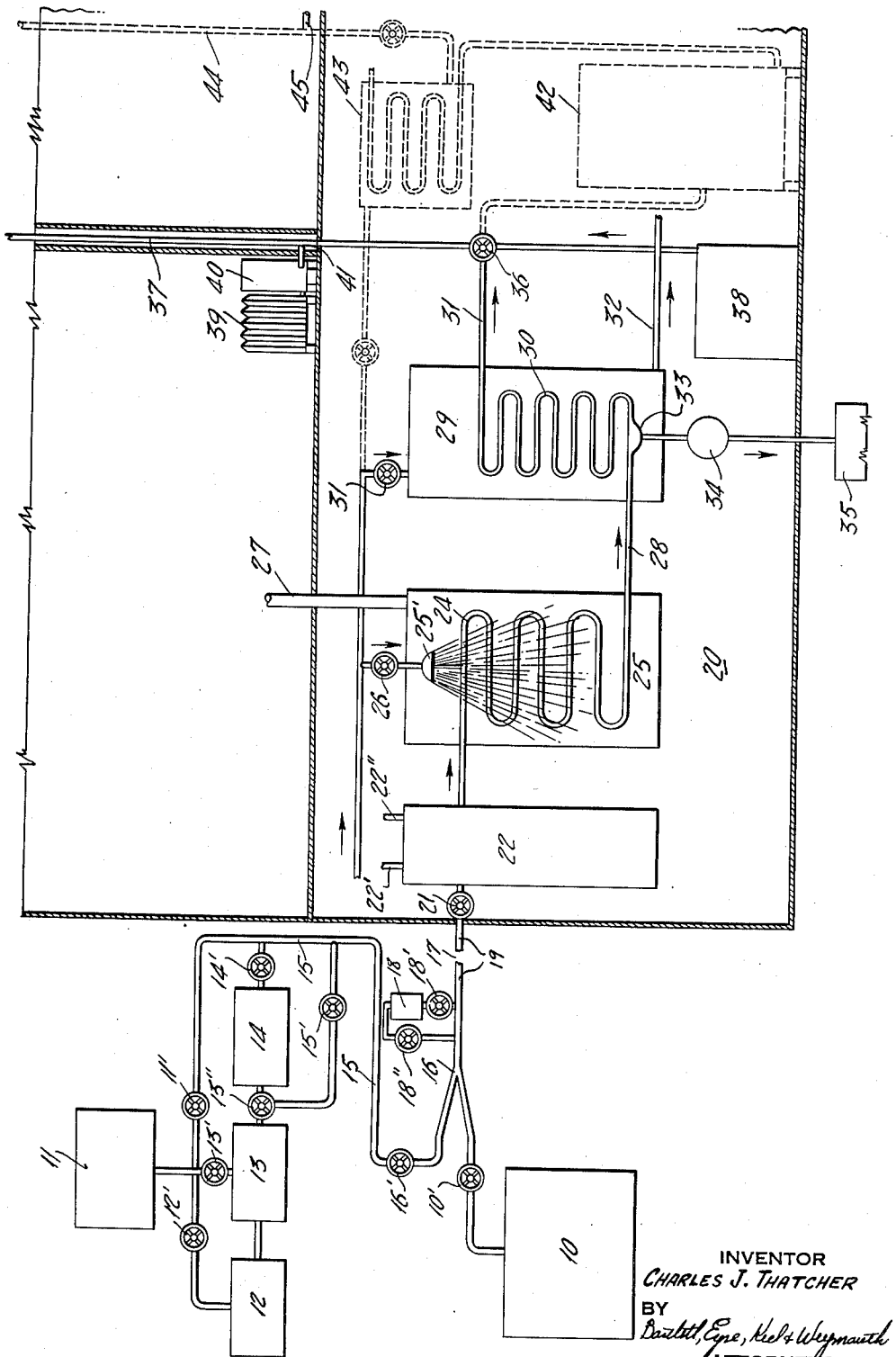
INVENTOR
CHARLES J. THATCHER
BY
Bartlett, Eyre, Keel & Weymouth
ATTORNEYS Patented Sept. 22, 1953

2,653,012

UNITED STATES PATENT OFFICE 2,653,012

METHOD AND SYSTEM FOR AIR CONDITIONING

Charles J. Thatcher, New York, N. Y.

Application August 12, 1948, Serial No. 43,815

4 Claims. (Cl. 257—8)

This invention relates to heating systems; and more particularly concerns improvements in the use of district or central steam heating plants and their street mains like or similar to those now employed in cities, or by institutions, for heating one or more distant buildings or groups of buildings.

One object of the invention is the extension of the profitable operating season of such systems by providing a load in the summertime for the plant equipment and street mains equal to or commensurate with the steam demand in wintertime.

An object of my invention, therefore, is the improvement of district heating systems to enable them to provide year-round air conditioning for buildings now heated in cold weather by such systems.

Another object of the invention is a novel and improved method of providing summer air conditioning for any building normally heated in cold weather by a district heating plant.

Another object of the invention is to improve and extend the use of Piped Air Conditioning Systems described in my two issued United States Letters Patents, Reissue 21,203, and 2,244,319, and pending applications Serial Nos. 587,558, filed April 10, 1945, now Patent No. 2,582,297, granted January 15, 1952 and 8,445, filed February 14, 1948.

A further object is to provide means whereby a refrigerating fluid suitable for comfort cooling—which includes both cooling and dehumidifying—of the air in either existing or new structures, heated in winter by steam or hot water, can be supplied by the district plant when required by warmer weather conditions. Air itself when compressed at the district plant and distributed through street mains, can serve as such a refrigerating fluid by its expansion for comfort cooling of distant buildings. It is therefore a further object of this invention to provide optimum means whereby compressed air may be so produced and utilized.

Realization and use of the benefits of this invention will therefore result in the creation of a new public service, namely the wide-spread use of piped compressed air, metered and sold to the public as are water, gas and steam.

These and other objects will become more apparent from the following description and accompanying drawings forming part of this application.

The drawings illustrate diagrammatically one embodiment of my invention.

So far as I am aware, no means has been available, heretofore, to provide both heating and cooling, particularly of large buildings, by supply of a suitable fluid or mixture of fluids delivered thereto through existing or newly installed street steam mains.

At the present time, the peak load of district heating plants is in cold weather, during which periods sixty per cent. or more of the steam supplied by a central plant to its customers is used for heating buildings. Consequently, during warmer months of the year the steam-generating equipment of the plant and the mains of the system are not fully utilized and supply only such quantities of steam as are required in the customers' buildings for power heating water, cooking, sterilizing dishes, etc. Manifestly, it is desirable to have an approximately equal load throughout the year if possible, so that all equipment can be used at all seasons to maximum advantage.

To this end one form of the invention contemplates the use, in warmer months, of excess steam to suitably compress air at the plant, employing steam driven jet, rotary or reciprocating air compressors, with or without removal of the heat of compression, and the introduction of the compressed air, either alone or mixed with suitable quantities of steam, into existing, heat-insulated, steam mains which supply one or more distant buildings with steam for heating purposes. The compressed air or mixture of air and steam, upon arrival at the building, will then be employed, first, for furnishing the heat necessary for cooking, heating hot water for use in a building and for any other present purposes whereby steam is advantageously used and condensed; and the remaining cooled compressed air can then be delivered to the pipes of the normal heating system of the building to be used for summer comfort cooling, for example, by the piped air conditioning systems of the type described in my United States Letters Patent Reissue 21,203 and 2,244,319 and my aforesaid Patent No. 2,582,297 and pending application Ser. No. 8,445. It is apparent that the air of the steam-air mixture may also be used, if desired, in other periods of the year for refrigerating or other purposes. Although it may be customarily better to use a mixture of steam and air, it may be sometimes desirable to supply compressed air alone, without the addition of the steam, in the event heat is not required in the buildings in the summertime.

In this new and improved system, when employing existing steam mains for year-round air conditioning in accordance with my invention, it may be preferable to purify the air and prevent corrosion of the steam mains by removing suspended solid matter, carbon dioxide, acid fumes, and other gases. And in the event air alone is supplied to the buildings, it may be preferable to cool and thus to dehumidify the air prior to delivery to the buildings through street mains.

If, in some instances, it is found preferable to remove the heat of compression at the central plant and to conduct cooled air or air at the temperature of the ambient atmosphere through the street mains, heat can nevertheless be provided for customary summer demands by utilizing the energy of expansion of compressed air in the basement, or at central points in buildings, to boost the pressure of the primary air stream by methods and apparatus described in my U. S. Patent 2,244,319 and in my copending applications before specified. Thus, the heat of compression resulting from the boosting of the air pressure can be used to produce the hot water supply of the building, by counter-flow in a heat exchanger of the water and the heated compressed air, as will later be described in detail.

Under circumstances in which insufficient heat is obtainable from the primary and secondary heat of compression, either or both together, for summer heat demands, I mix suitable volumes of steam and air at the central plant and conduct the mixture at elevated temperature and pressure through the existing mains to the distant buildings of the customers. For example, a mixture of one volume of steam at a pressure of 145 lbs. gauge p. s. i. and a temperature of about 365° F. may be commingled with say 4 volumes of compressed air at the same temperature and pressure at the central plant, and the mixture is then conducted through the steam mains to the distant buildings and there utilized by customers by passing the mixture, first, through suitable heat exchangers to provide, successively, small quantities of low pressure steam, sterilization, hot water supply, etc. The condensate resulting from the cooling of the steam in such heat exchangers will be metered to determine the charges to the customers for the service.

There will remain, thereafter, air at a pressure of about 145 lbs. per square inch which will be saturated with water vapor at its temperature, and which temperature can be from 70° to 90°, viz: 15° above the temperature of the water flowing in summer into the last heat exchanger from city water supply systems. Air at said pressures and temperatures contain very little water vapor, e. g., less than 2.0 grains per cu. ft., and is eminently suitable for summer air conditioning purposes when expanded under a load in one of the air expansion units described in my aforesaid patents and patent applications. The load referred to herein can be any form of air compressor, for example one such as is illustrated in Fig. 2 of my U. S. Patent No. 2,244,319. The air issuing from the expansion unit will be far below zero and can be used either to chill water to be circulated through risers specially installed in a building for central cold water supply for selective air conditioning by any of the known methods; or, and preferably, the compressed air can be conducted directly to the existing steam or hot water mains of the building and expanded at or near each radiator in one of my room air expansion units to produce completely conditioned air as described in my said patents and applications.

It is to be noted that oxygen, when under high pressure even if moist and hot is itself an inhibitor of corrosion of iron and steel; oxygen at the pressures here employed is particularly effective as an inhibitor if it contains little or no carbon dioxide or sulfur compounds. Purified, high pressure air, has been found to make ferrous metals passive, just as does concentrated nitric acid and for an analogous reason, viz: that both form highly protective adherent coatings of hydrates and oxides of iron which protect the underlying metal from further oxidation.

Presence of carbon dioxide or sulfur dioxide seems to detrimentally affect the physical nature and adhesion of the said protective coating during its formation. Consequently in the practice of this invention, it will be preferable to exercise particular care in purifying the compressed air initially conducted through metal street mains, or at the time when a switch-over from steam to steam-air mixtures is instituted. It will be found that after hot compressed air (e. g. at 350° F. and 5 to 10 atmospheres) from which carbon dioxide and sulfur dioxide or other acid gases have been removed as by means herein described, has flowed through the street pipes for several hours, that thereafter less pure steam-air mixtures of the kind herein described can be delivered to distant customers' buildings without detrimental corrosion to the mains.

It is not necessary, in fact it is not desirable, that the hot compressed air stream flowing through the pipes during the passivating period should be absolutely dry. For iron or steel do not react under red heat with oxygen or air containing no water vapor whatsoever. But even mere traces of water vapor act catalytically upon the iron-oxygen reaction accelerating it sufficiently for the passivating of the interior of the street mains in the way and for the purpose here specified.

If, however, it is desired further to safeguard the pipes and not depend entirely upon passivity of the interior of the pipe then I prefer to add to the stream, either of compressed air or steam, or both, a material, preferably liquid, which by deposition on the interior of said mains prevents or inhibits the reaction between iron and oxygen, water vapor and/or $CO_2$. An example of a substance which will prevent oxidation, rusting and corrosion of iron or steel under these conditions is a light engine oil having a paraffin base and a suitable vapor tension. The oil should be so selected that it will condense from the vapor phase on the interior walls of the pipes of the mains; since these walls will be somewhat cooler than the stream of moist compressed air or compressed air and steam flowing through the mains, an oil can be selected which will condense on the interior of the mains despite the fact that it remains in the vaporous state in the hotter stream of fluid flowing through the mains. Consequently the interior of the mains becomes covered with a film of liquid oil which will effectually prevent oxidation and corrosion of the interiors of the mains.

It may be desirable to provide means every mile or few miles along the street mains to inject appropriate quantities of oil for this purpose. The quantity needed for each oil injector will then be but a gallon or a few gallons which will be sufficient for a week or more; and it may be found that one coating of oil provided by such means will be sufficient for a considerable length of time. The oil can be injected by a cylindrical or other suitably shaped container provided with a drain and a cock which allows oil to drip into the main and strike a baffle plate situated in the stream and in the line of the falling drops; by which means the oil, as it drips off the baffle plate, will be atomized and carried along in the stream flowing therethrough. By providing a suitable valved branch which permits establishment after the oil container has been filled of the same pressure over the oil in the container as that of the fluid flowing through the main, equilization of pressure above and below the oil and gravity flow of the oil can be attained.

In place of oil a solution of some other substance which acts to form a protective coating and thus further inhibits oxidation of iron by the oxygen in the presence of water vapor can be used and in the same manner. An example of such a substance is a 0.2% solution of agar-agar or sodium alginate.

All the foregoing is illustrated diagrammatically by the accompanying drawing in which 10 denotes a steam generator plant such as those now installed in district or central steam heating stations. 11 denotes an air compressor including its motive power and which could be a turbine or even a steam jet deriving its steam from the steamplant 10. 12 denotes a cooling device to remove the heat of compression from the air compressed in 11; it can be used whenever it is found desirable to coil the compressed air in order to condense water vapor normally carried by high temperature, high pressure air. The condensed moisture, in the form of water, will be drained off by a suitable device included in the cooler 12, leaving dehumidified compressed air containing not more than a few grains of moisture per cubic foot.

From the cooler 12 the compressed air may then flow into a purifier 13 in which the nearly dry stream of compressed air may be purified, as by exposing it to a chemical, such as slacked lime, which will absorb carbon dioxide, sulphur dioxide or any acid fumes found in city air, which might have a detrimental effect upon the street mains and other equipment used in a district heating system. On the other hand, by a proper setting of the valves 12' and 13', the compressed air can be conducted directly from compressor 11 to purifier 13 without or even before cooling it in 12.

At 14 the previously cooled and/or purified compressed air can be reheated, as by counterflow and heat exchanger with the hot compressed air from 11, so that the purified compressed air can be delivered into pipe 15 at a temperature and pressure equal to those of the steam flowing from the steam generator 10. This reheating will be accomplished by proper setting of the valves 13", 14' and 15'. By closing valves 12', 13', 14' and 15' and opening valve 11' the compressed air can be delivered from the air compressor 11 through main 15 directly to the junction point 16 of the compressed air and steam mains.

If at any time it is desired to deliver compressed air unmixed with steam to the street mains 17, this will be accomplished by closing valve 10' and opening valve 16'. In the winter season or when compressed air is not required, valve 16' will be closed and valve 10' open at all times. The compressor 11 and its auxiliaries 12, 13 and 14 will be unused whenever compressed air is not required.

By the arrangement shown at 18, light paraffin base engine oil or other suitable liquid can be injected in the form of vapor into the stream of fluid flowing through the street main and in the manner previously discussed. In the illustrated structure for accomplishing this end, 18' denotes the cock which permits the flow of the oil in a rapid succession of drops into the main; and 18" denotes a valve which, when opened, establishes a pressure above the body of engine oil in container 18 equal to the pressure below the oil whereby it can flow into the steam-air current by gravity, as and for the purpose previously described.

17 denotes the section of the main between the district or central steam generating station and a distant customer's building, which may be a fraction of a mile or several miles, dependent upon the distance of the customer's building from the nearest adjacent steam plant.

With the fluid mixture delivered to the distant customer's building through the main 19 the stream enters the building below ground for example into the basement 20 of a large apartment or office building, its flow being controlled by a valve 21. Before or after the pressure of the steam is reduced (as by a pressure reducing valve—not shown) it may be used in devices illustrated schematically at 22 for the provision of power or heat for cooking, which require high temperature and/or high pressure steam. Where the devices using such steam are not located in the basement, branch pipes at 22' and 22" may circulate the fluid stream or a portion of it through the building to those portions where there is demand for high temperature pressure steam. This demand will be, in most instances, only for a minor portion of the total high pressure steam drawn from the street mains.

The balance of the steam and compressed air mixture may then flow to the building main through a pressure reducing valve (not shown) if desired or it may preferably, as shown, be delivered without reduction of pressure directly to the coil 24 in the heat exchanger 25. In heat exchanger 25 water is sprayed, as illustrated at 25', over the coils 24 through which flows the stream at temperatures approximating, say 325° F. The rate of the water supply, which is converted into spray at nozzle 25', can be controlled by valve 26 and in such a way that all the water sprayed over the coils 24 will be vaporized and converted into low pressure steam which will flow up pipe 27 and be delivered to such portions of the building as require low pressure steam.

The fluid stream, still consisting of a mixture of steam and air at temperatures considerably above the boiling point of water, may now flow through pipe 28 into heat exchanger 29 provided with a suitable coil 30.

The coil 30 is bathed in tank 29 by cool water delivered from the city water main by the opening of valve 31; and water will thereby flow through heat exchanger 29 to its outlet 32 in a counter-direction to the flow of the steam and air mixture through coil 30. The result will be that cold water, that is, water at customary summer temperature of city water, say 60° to 70°, will meet the upper sections of coil 30; consequently all steam and water vapor still remaining in the fluid flowing through coil 30 will be condensed except for the few grains of moisture which are carried by compressed air at pressures over 100° gauge at atmospheric temperatures and which, as already stated, amounts to less than two grains per cubic foot.

The water flowing out of the lower portion of heat exchanger 29 through the pipe 32, on the other hand, can and will have a temperature of say 15° below the temperature of the steam and air mixture flowing into heat exchanger 29 through pipe 28. The consequence is that hot water will flow out of exit pipe 32 of heat exchanger 29 and be conducted to a tank (not shown) from which the hot water supply of the building will be drawn by the customary means of circulation.

By the foregoing described means the steam component of a steam-compressed air mixture will be completely utilized for the purposes for which steam alone is now used by customers provided with steam from a central or district plant.

By providing a sump, as at 33, at the lowest point of the piped system of the building all of the steam condensed as a result of its use by the customer will collect in the form of water and flow by gravity to the meter 34 and thence to the sewer or an heat economizer 35. Since there will be a direct ratio between the amount of steam thus used and the amount of compressed air still remaining to be used by the customer for comfort cooling, the customer will be charged pro rata by the reading of the meter 34 both for the steam used and for the compressed air also used pro rata for the subsequent air conditioning of its building.

There will now remain a supply of compressed air at a temperature of say 15° above the temperature of water flowing from city mains, carrying very little moisture and eminently suitable for air conditioning by the methods and devices described in my aforesaid U. S. patents and applications. When this compressed air is used with the piped air conditioning systems of my said patents and applications, a two-way valve 36 will be set in the summer time so that the stream of compressed air flows into the risers of the heating system denoted by the numeral 37, of the building; and the two-way valve 36 is so set that during the summer season when compressed air is being supplied to the steam risers of the building any standby furnace 38 is shut off and no high pressure air is delivered thereto. When cooler weather arrives, two-way valve 36 will be set in the opposite direction so that no steam from furnace 38 flows into line 31. Of course in most instances no stand-by furnace, such as that illustrated at 38, will exist in the building, in which case line 31, delivering nearly dry compressed air, will be connected directly to risers 37 of the building.

At 39 and 40 are illustrated a cast iron radiator and one of my room air expansion units attached thereto, such as I have described and illustrated in my issued patents and my pending applications aforesaid. Cooling, dehumidifying, ventilation, circulation and filtration of the air in summer seasons will be accomplished as described in the said patents and applications by expansion in 40 of the stream of compressed air flowing through risers 37, after it has been tapped off as needed at each floor as, for example, at 41 as illustrated in the drawing.

Alternatively, where it is desired to use chilled water for summer comfort conditioning of air as, for example, is done in most presently used central cold water systems or in selective cooling, such chilled water can be provided by installation in the basement or other central point of the building 20 of a large size room air cooler 42 of the type described in my aforesaid Patent No. 2,582,297. In this modification the dehumidified compressed air, delivered by pipe 31 from hot water generator 29, will flow directly to one (42) or a number of large scale expansion units of the type shown in my said application; and by expansion therein under a load will produce air having temperatures from 50 down to 75° below zero which can be used in the heat exchanger 43 to chill water; and said chilled water can then be circulated through the building either through hot water pipes of the heating system, as by known methods now used, or through specially insulated risers 44 installed for circulation of chilled water and extending to the top of the building. Cold water can then be tapped off at each floor from said riser as illustrated at 45, and be conducted by suitable pumps to the offices or apartments of tenants using the chilled water in air coolers to condition and dehumidify the air according to the so-called selective cooling method now in use.

Although I have described only one embodiment of the invention, it is apparent that certain modifications and changes can be made without departing from the scope thereof.

I claim:

1. In a district steam-heating system, the combination with its central steam generating plant and installed thermal network for distributing steam therefrom to rooms of remote buildings having steam risers and hot water supply equipment, of an adjunct hot water supply and air cooling means for use in warm weather, comprising: air compressing means located at said central plant powered by the energy-generating facilities thereof; piping and mixing means at the central plant to introduce said compressed air together with steam at substantial pressure and temperature, into said thermal network; channeled, water-cooled heat exchanging means in said remote buildings connected to said network; means in said buildings to control the flow of the said pressure fluids through said heat exchanging means and to condense steam and moisture from the compressed air thereby to heat the cooling water; means to connect the pressure fluid channel of the heat exchanging means to the steam risers and supply lines of the heating system of the buildings and to connect the water outlet of the exchanging means to the hot water supply equipment of the buildings; air-expansion motors operable by compressed air under a load and means for connecting the same to said supply lines; and means to discharge the cooled and dehumidified exhaust from said motors into the air of said rooms—thus to provide in warm weather, from a remote source of energy by use of existing public utilities, both hot water and cooled, dehumidified air to a multiplicity of rooms of remote buildings.

2. The combination according to claim 1, wherein means are provided at the central plant to remove acid-reacting constituents from the compressed air.

3. The method of so operating a district steam-heating system, including its piped thermal distributing network and a central energy-generating plant as to provide central-station, summer cooling and air conditioning and hot water supply to rooms of a multiplicity of remote structures having piped room-heating and water-heating equipment, which comprises producing at said central station, in warm weather, a mixture of steam and air under substantial pressure and temperature originated by the energy-generating facilities of the central station; conveying the hot mixture of pressure fluids through the thermal network to said remote structures; absorbing the heat and condensing the moisture from the hot pressure media by heat exchange with cooling water through said water-heating equipment; conveying the cooled, dehumidified, compressed air to the said piped heating equipment; chilling the air by expanding it under a load; and then flowing the expanded, cooled air into the room.

4. The improved method of operating a district steam-heating system having a central, energy-generating plant and steam distributing street mains, which comprises preparing, with the aid of the energy-generating facilities of the central plant, a mixture of steam and air at elevated temperature and pressure, conducting said mixture to and through the street mains of the system to distant buildings, and then flowing the mixture through a heat exchanger to condense the steam and dehumidify the air; and then expanding the residual air in a loaded air expansion engine to chill the air, thus to provide both heating and cooling media for use in said buildings in warm weather.

CHARLES J. THATCHER.

References Cited in the file of this patent

UNITED STATES PATENTS

| Number | Name | Date |
|---|---|---|
| Re. 21,203 | Thatcher | Sept. 5, 1939 |
| 515,585 | Hill | Feb. 27, 1894 |
| 732,749 | Kehm | July 7, 1903 |
| 1,879,685 | Jaczko | Sept. 27, 1932 |
| 2,038,347 | Cornell, Jr. | Apr. 21, 1936 |
| 2,104,385 | Hendrey | Jan. 4, 1938 |
| 2,244,319 | Thatcher | June 3, 1941 |

OTHER REFERENCES

"Uses and Applications of Chemicals and Related Materials," by Thomas C. Gregory, Reinhold Publishing Corp., 1939, Copy in Div. 64.